(12) United States Patent
Chen et al.

(10) Patent No.: US 8,452,137 B2
(45) Date of Patent: May 28, 2013

(54) OPTICAL BACKPLANE HAVING AT LEAST ONE OPTICAL RELAY ELEMENT FOR RELAYING LIGHT FROM AN INPUT FACET OF THE BACKPLANE TO AN OUTPUT FACET OF THE BACKPLANE

(75) Inventors: Ye Chen, San Jose, CA (US); Penyue Wen, San Jose, CA (US); Ron Kaneshiro, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 331 days.

(21) Appl. No.: 13/004,024

(22) Filed: Jan. 10, 2011

(65) Prior Publication Data
US 2012/0175535 A1  Jul. 12, 2012

(51) Int. Cl.
*G02B 6/12* (2006.01)

(52) U.S. Cl.
USPC .................... 385/14; 385/15; 385/31; 385/33

(58) Field of Classification Search
USPC ......................................... 385/14, 15, 31, 33
See application file for complete search history.

(56) References Cited

U.S. PATENT DOCUMENTS

| | | | |
|---|---|---|---|
| 4,421,383 A | 12/1983 | Carlsen | |
| 4,720,634 A | 1/1988 | D'Auria et al. | |
| 4,872,739 A | 10/1989 | Kahn et al. | |
| 5,182,780 A | 1/1993 | Robertson | |
| 5,743,785 A | 4/1998 | Lundberg et al. | |
| 6,005,991 A | 12/1999 | Knasel | |
| 6,085,003 A | 7/2000 | Knight | |
| 6,332,050 B1 | 12/2001 | Feldman et al. | |
| 6,442,323 B1 | 8/2002 | Sorosiak | |
| 6,488,026 B2 | 12/2002 | Lauer | |
| 6,821,028 B2 | 11/2004 | Morris et al. | |
| 6,850,671 B2 | 2/2005 | Carnevale et al. | |
| 6,886,988 B2 | 5/2005 | Brown et al. | |
| 7,062,132 B2 * | 6/2006 | Basavanhally et al. | 385/52 |
| 7,082,238 B2 | 7/2006 | Nishimura | |
| 7,245,813 B2 | 7/2007 | Brown et al. | |
| 7,280,732 B2 | 10/2007 | Granger et al. | |

(Continued)

FOREIGN PATENT DOCUMENTS

| | | |
|---|---|---|
| GB | 2247127 A | 2/1992 |
| GB | 2322204 | 8/1998 |
| JP | 2004-212847 | 7/2004 |

OTHER PUBLICATIONS

Ishii, Y. Koike, S. Arai, Y. Ando, Y.; SMT-Compatible Optical-I/O Chip Packaging for Chip-Level Optical Interconnects; IEEE Explore; 2001; pp. 870-875.

(Continued)

*Primary Examiner* — Jennifer Doan

(57) ABSTRACT

An optical backplane is provided that has at least first and second side walls that are generally parallel to one another and at least one optical relay element disposed on at least one of the parallel side walls. An optical signal is coupled into the optical backplane through an entrance facet of the backplane. The optical signal is maintained within the optical backplane by internal reflection at the parallel side walls of the backplane. The optical relay element receives the optical signal reflected off of one of the side walls and reflects and refocuses the optical signal to guide the optical signal and prevent it from diverging as it propagates through the backplane from the entrance facet to the exit facet.

23 Claims, 3 Drawing Sheets

U.S. PATENT DOCUMENTS

| | | | |
|---|---|---|---|
| 7,296,935 B1 | 11/2007 | Childers et al. | |
| 7,508,882 B2 * | 3/2009 | Adamiecki et al. | 375/291 |
| 7,841,777 B2 | 11/2010 | Howard et al. | |
| 8,032,003 B2 | 10/2011 | Childers et al. | |
| 8,052,334 B2 | 11/2011 | Childers et al. | |
| 8,104,973 B2 | 1/2012 | Howard et al. | |
| 8,275,266 B2 * | 9/2012 | Tan et al. | 398/131 |
| 2004/0096165 A1 | 5/2004 | Childers et al. | |
| 2006/0115217 A1 | 6/2006 | Childers et al. | |
| 2006/0115218 A1 | 6/2006 | Childers et al. | |
| 2006/0210225 A1 | 9/2006 | Fujiwara et al. | |
| 2010/0135618 A1 | 6/2010 | Howard et al. | |
| 2010/0202735 A1 | 8/2010 | Childers et al. | |
| 2010/0215319 A1 | 8/2010 | Childers et al. | |
| 2011/0206324 A1 | 8/2011 | Childers et al. | |
| 2011/0229678 A1 | 9/2011 | Childers et al. | |

OTHER PUBLICATIONS

Martin Stach; 10 Gbit/s Data Transmission Experiments over Optical Backplane Waveguides with 850 nm Wavelength Multimode VCSELs; University of Ulm Optoelectronics Department; Annual Report 2002; pp. 1-6.

Brian Robertson; Design of an Optical Interconnect for Photonic Backplane Applications; Applied Optics; May 10, 1998; pp. 2974-2984; vol. 37, No. 14.

* cited by examiner

OPTICAL BACKPLANE HAVING AT LEAST ONE OPTICAL RELAY ELEMENT FOR RELAYING LIGHT FROM AN INPUT FACET OF THE BACKPLANE TO AN OUTPUT FACET OF THE BACKPLANE

TECHNICAL FIELD OF THE INVENTION

The invention relates to an optical backplane, and more particularly, to an optical backplane having one or more optical relay elements for guiding light and preventing the light from diverging as it propagates from an input facet of the backplane to an output facet of the backplane.

BACKGROUND OF THE INVENTION

A "traditional backplane" is a circuit board (usually a printed circuit board (PCB)) having several electrical connectors that are connected in parallel with each other such that each pin of each electrical connector is linked to the same respective pin of all the other electrical connectors, thereby forming a computer bus. Such backplanes are typically used as a backbone to connect several PCBs together to form a complete computer/switch system. In such systems, the data is transmitted as electrical signals. As a result, when the data rate is high and the lengths of the conductors of the backplane over which the signals must be transmitted are great, signal integrity and power consumption become concerns.

Attempts have been made to overcome signal integrity and power consumption issues associated with traditional circuit board backplanes by using optical backplanes to interconnect electrical devices, such as integrated circuits (ICs) and PCBs. In optical backplanes, optical signals that have been converted from the electrical domain to the optical domain by electrical-to-optical (E/O) converters are coupled by a lens system of the optical backplane into an entrance facet of the optical backplane. The optical signals then propagate over optical waveguides of the optical backplane to an exit facet of the optical backplane. As the optical signals pass out of the exit facet of the optical backplane, they are coupled by a lens system of the optical backplane onto optical-to-electrical (O/E) converters, which convert the optical signals into electrical signals. The E/O converters are typically light emitting diodes (LEDs) or laser diodes. The O/E converters are typically photodiodes. The optical waveguides are typically optical fibers.

One of the disadvantages of optical backplanes of the type described above is that they require very precise alignment between the E/O and O/E converters and the respective lens systems and between the respective lens systems and the entrance and exit facets of the optical backplane. If the alignment between these elements is not extremely precise, optical coupling efficiency will be reduced and the corresponding optical signals will be degraded. This requirement for high-precision alignment imposes extremely tight tolerances on the manufacturing process, which increases the difficulty and costs associated with manufacturing the optical backplanes. In addition, the requirement for high-precision alignment becomes even more critical as the distance between the entrance and exit facets increases due to divergence of the light beam as it propagates through the backplane. Therefore, longer optical backplanes require higher precision alignment and therefore have tighter manufacturing tolerances. Consequently, longer optical backplanes are more difficult and costly to manufacture.

Accordingly, a need exists for an optical backplane that can be manufactured with more relaxed manufacturing tolerances and with longer lengths.

SUMMARY OF THE INVENTION

The invention is directed to an optical backplane and a method for propagating optical signals in an optical backplane. The optical backplane comprises at least one electrical-to-optical (E/O) converter, a first optics system, a slab having at least first and second generally parallel side walls, at least one optical relay element disposed on or in at least one of the first and second side walls, a second optics system, and an optical-to-electrical (O/E) converter. The E/O converter is configured to receive an electrical signal and to convert the electrical signal into a light beam having a primary wavelength. The light beam is emitted from the E/O converter. The first optics system is configured to collimate the light beam emitted by the E/O converter and to steer the collimated light beam. The slab is made of material that is transparent to at least the primary wavelength. The slab has a first entrance facet and a first exit facet located at or near opposite ends of the slab. The slab is positioned relative to the first optics system such that the first entrance facet is generally aligned with the first optics system. At least one optical relay element is disposed on or in at least one of the first and second side walls and is configured to perform reflection and refocusing operations on a light beam received thereby.

The first optics system couples the collimated light beam emitted by the E/O converter into the slab through the first entrance facet. The collimated light beam is reflected at least once off of at least one of the first and second side walls and is incident on the optical relay element. The optical relay element reflects and refocuses the collimated light beam to guide the collimated light beam and prevent it from diverging as it propagates in the slab from the entrance facet to the exit facet. The second optics system, which is generally aligned with the first exit facet, is configured to receive the collimated light beam propagating out of the first exit facet and to focus the collimated light beam. The O/E converter is configured to receive the focused collimated light beam output from the second optics system and to convert the focused and collimated light beam into an electrical signal.

The method comprises the following: with at least one E/O converter, converting an electrical signal into a light beam having a primary wavelength and emitting the light beam from the E/O converter; with a first optics system, collimating the light beam emitted by the E/O converter and steering the collimated light beam toward a slab of material that is transparent to at least the primary wavelength; at a first entrance facet of the slab, coupling the collimated light beam steered toward the slab by the first optics system into the slab such that the collimated light beam is reflected at least once off of at least one of first and second side walls and is reflected and refocused by at least one optical relay element disposed on at least one of the first and second side walls to guide the collimated light beam in the slab and to prevent if from diverging as it propagates in the slab from the first entrance facet to the first exit facet; with a second optics system generally aligned with the first exit facet, receiving the collimated light beam propagating out of the first exit facet and focusing it onto an optical-to-electrical (O/E) converter; and with the O/E converter, receiving the focused collimated light beam output from the second optics system and converting it into an electrical signal.

These and other features and advantages of the invention will become apparent from the following description, drawings and claims.

DETAILED DESCRIPTION OF AN ILLUSTRATIVE EMBODIMENT

In accordance with the invention, an optical backplane is provided that has at least first and second side walls that are substantially parallel to one another and at least one optical relay element disposed on at least one of the parallel side walls. An optical signal is coupled into the optical backplane through an entrance facet of the backplane. The optical signal is maintained within the optical backplane by internal reflection at the parallel side walls of the backplane. The optical relay element receives the optical signal and reflects and refocuses the optical signal to guide it and prevent it from diverging as it propagates through the backplane from the entrance facet to the exit facet. Illustrative embodiments of the invention will now be described with reference to FIGS. 1-3. It should be noted that the figures are not drawn to scale and are intended only to demonstrate the principles and concepts of the invention and not precise implementation details, as will be understood by persons skilled in the art in view of the description being provided herein.

Figure 1:
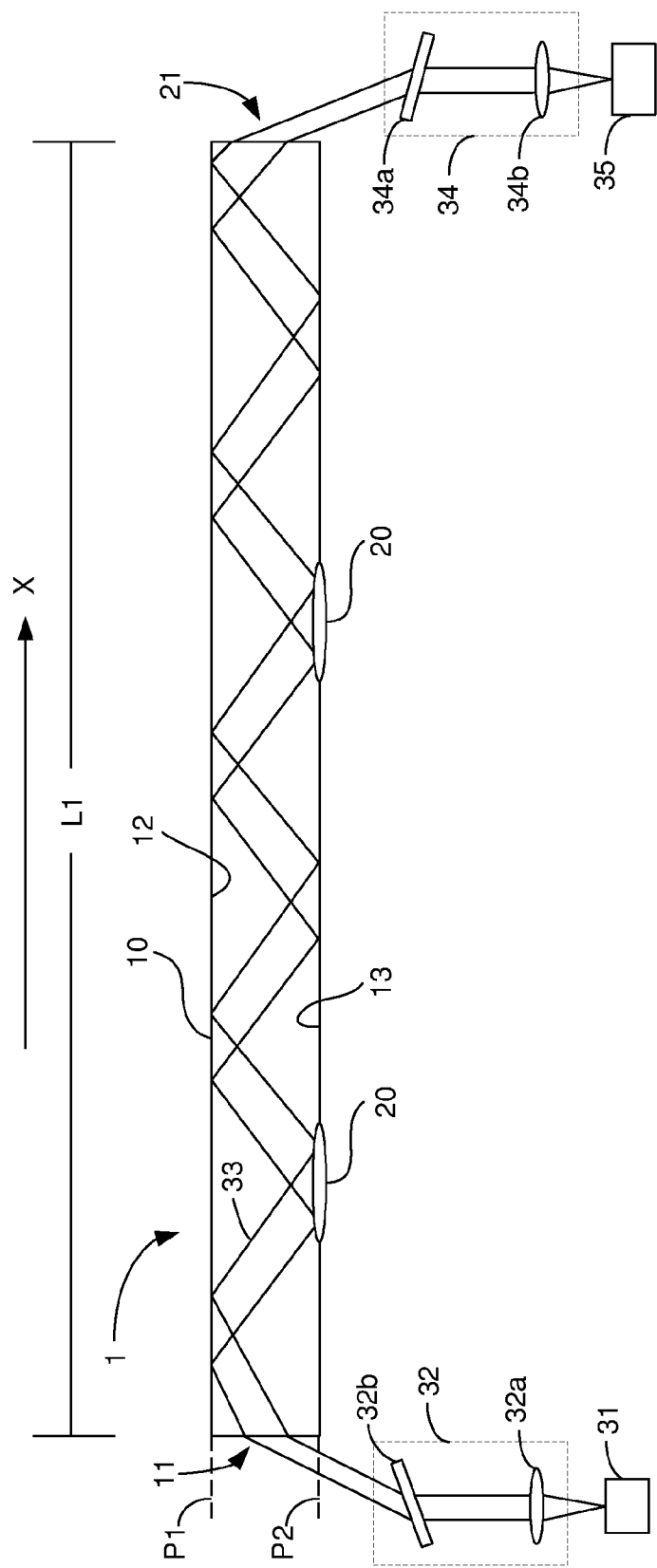
FIG. 1 illustrates a side plan view of the optical backplane in accordance with an illustrative, or exemplary, embodiment.

FIG. 1 illustrates a side plan view of the optical backplane 1 in accordance with an illustrative, or exemplary, embodiment. Typically, the optical backplane 1 is made of a solid piece of glass or plastic material, referred to hereinafter as a "slab". The optical backplane 1 comprises a slab 10 having an entrance facet 11, first and second side walls 12 and 13, at least one optical relay element 20 disposed on one or both of the side walls 12 and 13, and an exit facet 21. The first and second side walls 12 and 13 extend in first and second parallel planes P1 and P2, respectively. Therefore, the first and second side walls are parallel, or substantially parallel, to one another. The slab 10 is surrounded by air or some other medium that has a lower index of refraction than the glass or plastic material of which the slab 10 is made. Consequently, light coupled into the slab 10 through the entrance facet 11 will remain in the slab 10 due to total internal reflection (TIR) of the light beam at the respective interfaces between the side walls 12 and 13 and the surrounding medium.

The optical backplane 1 operates in the following manner. An E/O converter 31 produces a light beam in response to being modulated by an electrical signal produced by an electrical driver circuit (not shown). In accordance with this illustrative embodiment, the E/O converter 31 is a vertical cavity surface emitting laser diode (VCSEL), although other types of laser diodes and light emitting diodes (LEDs) may be used as the E/O converter 31. Shortly after the light beam is produced by the E/O converter 31, the light beam begins to diverge. A first optics system 32 receives the diverging light beam and collimates and steers the light beam toward the entrance facet 11 of the slab 10. In accordance with this illustrative embodiment, the first optics system 32 includes a collimating lens 32a that collimates the light beam and a refractive and/or diffractive optical steering element 32b that steers the light beam toward the entrance facet 11. The collimating lens 32a and the optical steering element 32b may be separate devices or integral parts of a unitary device. The collimated light beam 33 is then coupled into the slab 10 through the entrance facet 11.

The slab 10 is made of a material that is transparent to a primary wavelength of the light produced by the E/O converter 31. As the collimated light beam 33 propagates through the slab 10, it experiences TIR at the interfaces between the side walls 12 and 13 and the medium (not shown) that surrounds the slab 10. As indicated above, one or more optical relay elements 20 are disposed on one or both of the side walls 12 and 13 for reflecting and refocusing the light beam 33 to guide it and prevent it from diverging as it propagates through the slab 10. The optical relay elements 20 are typically TIR lenses that both reflect and refocus light. While a variety of TIR lenses are suitable for this purpose, a spherical lens is an example of a specific type of lens that is suitable for this purpose.

Using the optical relay elements 20 in the manner described above ensures that the light beam 33 remains collimated and is reflected at particular, predetermined locations along the side walls 12 and 13. As a result, most or all of the optical energy of the light beam 33 is coupled out of the slab 10 through the exit facet 21 onto a second optics system 34, which then steers and focuses the light beam 33 onto an O/E converter 35. In this way, optical coupling efficiency remains high and the potential for signal degradation is prevented or at least reduced. Maintaining high optical coupling efficiency also reduces power consumption, which allows the optical backplane 1 to be operated at relatively low costs. The second optics system 34 includes a diffractive and/or refractive optical steering element 34a and a focusing lens 34b. The optical steering element 34a and the focusing lens 34b may be separate devices or integral parts of a unitary device.

In addition to the advantages described above, use of the optical relay elements 20 reduces the sensitivity of the optical backplane 1 to optical alignment issues for the following reasons. Even if there is some degree of optical misalignment between the E/O converter 31 and the first optics system 32 or between the first optics system 32 and the entrance facet 11, the refocusing and reflecting operations performed by the optical relay elements 20 ensure that most or all of the optical energy of the collimated light beam 33 is coupled through the exit facet 21 onto the second optics system 34. In other words, it is unnecessary for the collimated light beam 33 to be perfectly centered on the optical relay elements 20 because even if the collimated light beam 33 is not perfectly centered on the optical relay elements 20, the refocusing and reflecting operations will reposition the beam 33 such that most if not all of the optical energy of the light beam 33 is efficiently coupled out of the exit facet 21 and focused by the second optics system 34 onto the O/E converter 35. Nevertheless, the angle of the light beam 33 relative to the slab 10 as it passes through the entrance facet 11 should be carefully chosen to ensure that the reflections along the side walls 12 and 13 occur at, or close to, the intended locations.

Reducing the sensitivity of the optical backplane 1 to alignment issues in this manner allows the optical backplane 1 to be manufactured with more relaxed manufacturing tolerances than known optical backplanes, which allows overall manufacturing costs to be reduced compared to known optical backplanes. Additionally, these features allow the optical backplane 1 to have longer lengths than known optical backplanes without sacrificing signal integrity. For example, the optical backplane 1 typically has a length, L1, in the X-dimension that ranges from about 0.5 meters (m) to about 1.0 m, which is significantly longer than known optical backplanes. It should be noted, however, that the optical backplane 1 is not limited to having any particular dimensions.

Figure 2:
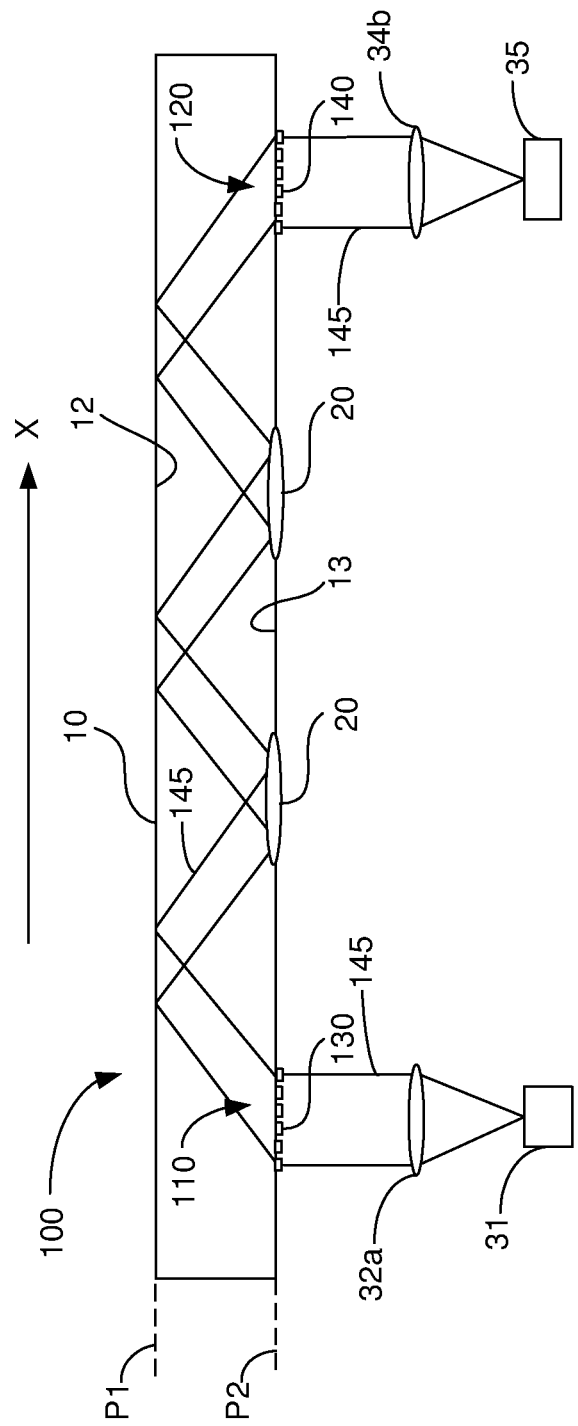
FIG. 2 illustrates a side plan view of the optical backplane in accordance with another illustrative embodiment.

FIG. 2 illustrates a side plan view of the optical backplane 100 in accordance with another illustrative embodiment. Like numerals in FIGS. 1 and 2 represent like elements or features. The optical backplane 100 is similar to the optical backplane 1 except that the entrance and exit facets 110 and 120 of the optical backplane 100 are on the second side wall 13 and include diffractive optical elements 130 and 140, respectively. The diffractive optical elements 130 and 140 are typically diffractive gratings formed in the second side wall 13. The diffractive optical elements 130 and 140 perform substantially the same steering functions performed by the optical steering elements 32b and 34a shown in FIG. 1. Thus, in accordance with this embodiment, the first optics system comprises the collimating lens 32a and the diffractive optical element 130 and the second optics system comprises the diffractive optical element 140 and the focusing lens 34b.

The optical backplane 100 operates as follows. The light beam produced by the E/O converter 31 is collimated by the collimating lens 32a into a collimated light beam 145. The collimated light beam 145 is incident on the second side wall 13 at an angle that is generally normal to the plane P2. The diffractive optical element 130 tilts the angle of the collimated light beam 145 as it enters the entrance facet 110 to steer the collimated light beam 145 to a particular, predetermined location on the first side wall 12. The collimated light beam 145 then reflects off of the first and second side walls 12 and 13 as it propagates toward the exit facet 120. The optical relay elements 20 reflect and refocus the collimated light beam as it is reflected off of the first and second side walls 12 and 13 in order to guide it and prevent it from diverging. The collimated light beam 145 is then coupled through the exit facet 120 out of the optical backplane 100. At the exit facet 120, the diffractive optical element 140 tilts the collimated light beam 145 to steer it in a direction that is generally normal to the plane P2 toward the focusing lens 34b. The focusing lens 34b then focuses the collimated light beam 145 onto the O/E converter 35, which then converts the optical energy of the light beam 145 into an electrical signal.

As with the optical backplane 1 described above with reference to FIG. 1, the use of the optical relay elements 20 in the optical backplane 100 reduces its sensitivity to alignment issues. In particular, even if there is some amount of misalignment between the E/O converter 31 and the collimating lens 32a or between the collimating lens 32a and the entrance facet 11, the refocusing and reflecting operations performed by the optical relay elements 20 will ensure that most or all of the optical energy of the collimated light beam 145 is coupled through the exit facet 120 and directed by the focusing lens 34b onto the O/E converter 35. As described above, these features result in more relaxed manufacturing tolerances, less manufacturing difficulty and lower manufacturing costs, lower power consumption during operations, and longer lengths (in the X-dimension) for the optical backplane 100 without sacrificing signal integrity.

Figure 3:
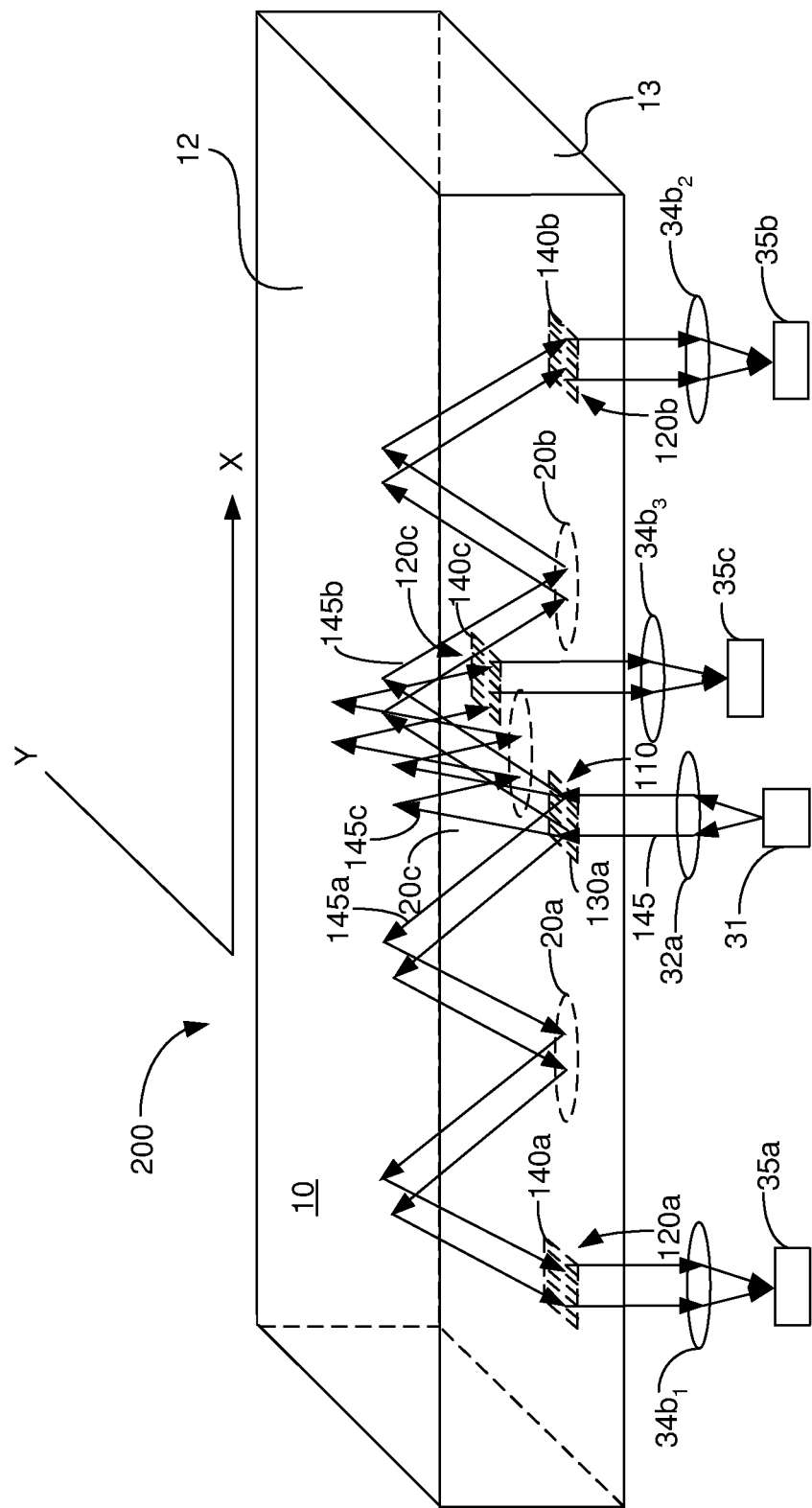
FIG. 3 illustrates a side perspective view of the optical backplane in accordance with another illustrative embodiment.

FIG. 3 illustrates a side perspective view of the optical backplane 200 in accordance with another illustrative embodiment. Like numerals in FIGS. 1, 2 and 3 represent like elements or features. The optical backplane 200 shown in FIG. 3 is very similar to the optical backplane 100 shown in FIG. 2 except that the optical backplane 200 has multiple exit facets 120 and the optical relay elements 20 and the diffractive optical elements 130 and 140 are arranged in a two-dimensional array (X- and Y-dimensions) on the second side wall 13 instead of in the one-dimensional array (X-dimension) depicted in FIG. 2. The optical backplane 200 shown in FIG. 2 is configured to broadcast the optical signal produced by the E/O converter 31 to multiple O/E converters 35.

The optical backplane 200 operates in the following manner. The E/O converter 31 produces a light beam in response to being modulated by an electrical signal produced by an electrical driver circuit (not shown). Shortly after the light beam is produced by the E/O converter 31, the light beam begins to diverge. The collimating lens 32a receives the diverging light beam and collimates the light beam. The collimated light beam 145 is incident on the diffractive optical element 130a located at the entrance facet 110. The diffractive optical element 130a splits the collimated light beam into three collimated light beams 145a, 145b and 145c and tilts the collimated light beams 145a, 145b and 145c by predetermined angles such that the collimated light beams 145a-145c are incident on the first side wall 12 at three different predetermined, i.e., intended, locations. The collimated light beams 145a-145c are reflected by the first side wall 12 onto the respective optical relay elements 20a, 20b and 20c. The respective relay elements 20a, 20b and 20c then reflect and refocus the collimated light beams 145a-145c such that they again impinge on and are reflected by the first side wall 12. The reflected light beams 145a-145c are then incident on the diffractive optical elements 140a, 140b and 140c located at the exit facets 120a, 120b and 120c respectively. The diffractive optical elements 140a, 140b and 140c then direct the respective collimated light beams 145a-145c onto their respective focusing lenses $34b_1$, $34b_2$ and $34b_3$. The respective focusing lenses $34b_1$, $34b_2$ and $34b_3$ then focus the respective light beams 145a-145c onto the O/E converters 35a, 35b and 35c, respectively.

Using the optical relay elements 20a-20c in this manner ensures that the collimated light beams 145a-145c remain collimated and are reflected at, or very near to, particular, predetermined locations along the side walls 12 and 13. As a result, most or all of the optical energy of the collimated light beams 145a-145c is coupled out of the backplane 200 through the respective exit facets 120a-120c onto the respective focusing lenses $34b_1$-$34b_3$ and focused thereby onto the respective O/E converters 35a-35c. As with the embodiments described above with reference to FIGS. 1 and 2, the optical backplane 200 can be manufactured with more relaxed manufacturing tolerances, leading to less manufacturing difficulty and lower manufacturing costs. Also for the reasons described above, the optical backplane 200 can be operated with lower power consumption and can have longer lengths (in the X- and Y-dimension) without sacrificing signal integrity.

As indicated above, the slab 10 is typically made of glass or plastic. If the slab 10 is made of glass, the optical relay elements 20 and the diffractive optical elements 130 and 140, if employed, are typically formed on one or both of the side walls 12 and 13 by using well-known epoxy replication techniques. If the slab 10 is made of plastic, the optical relay elements 20 and, if employed, the diffractive optical elements 130 and 140, are typically formed on one or both of the side walls 12 and 13 by using a well-known molding process that is used to create the slab 10. Thus, in the latter case, the slab 10, the optical relay elements 20 and any diffractive optical elements 130 and 140 are formed during a single molding process. In both cases, the optical backplane 1, 100 and 200 can be easily manufactured with relatively relaxed manufacturing tolerances at relatively low costs and with increased lengths. The length, L1, of the optical backplane 200 from the entrance facet 110 to exit facet 120a is typically between about 0.5 m and 1.0 m. Likewise, the lengths, L2 and L3, of the optical backplane 200 from the entrance facet 110 to exit facets 120*b* and 120*c* are typically between about 0.5 m and 1.0 m.

It should be noted that the invention has been described with reference to a few illustrative embodiments for the purposes of describing the principles and concepts of the invention. The invention, however, is not limited to these embodiments, as will be understood by persons skilled in the art in view of the description provided herein. Many variations may be made to the embodiments described herein, and all such variations are within the scope of the invention.

What is claimed is:

1. An optical backplane comprising:
    at least one electrical-to-optical (E/O) converter configured to receive an electrical signal and to convert the electrical signal into a light beam having a primary wavelength, the light beam being emitted from the E/O converter;
    a first optics system configured to collimate the light beam emitted by the E/O converter and to steer the collimated light beam;
    a slab of material that is transparent to at least the primary wavelength, the slab having at least first and second side walls, a first entrance facet, and a first exit facet, the first and second side walls being at least substantially parallel to one another, the first entrance and exit facets being located at or near opposite ends of the slab, the slab being positioned relative to the first optics system such that the first entrance facet is generally aligned with the first optics system;
    at least one optical relay element disposed on or in at least one of the first and second side walls, said at least one optical relay element being configured to perform reflection and refocusing operations on a light beam received thereby, and wherein the first optics system couples the collimated light beam into the slab through the first entrance facet, wherein the collimated light beam is reflected at least once off of at least one of the first and second side walls and is incident on said at least one optical relay element, wherein said at least one optical relay element reflects and refocuses the collimated light beam to guide the collimated light beam and prevent the collimated light beam from diverging as the collimated light beam propagates in the slab from the entrance facet to the exit facet;
    a second optics system generally aligned with the first exit facet, wherein the second optics system is configured to receive the collimated light beam propagating out of the first exit facet and to focus the collimated light beam; and
    an optical-to-electrical (O/E) converter configured to receive the focused collimated light beam output from the second optics system and to convert the focused and collimated light beam into an electrical signal.

2. The optical backplane of claim 1, wherein at least two of the optical relay elements are disposed on or in at least one of the first and second side walls, each of the optical relay elements reflecting and refocusing the collimated light beam reflected off of one of the first and second side walls to guide the collimated light beam and to prevent the collimated light beam from diverging as the collimated light beam propagates in the slab from the entrance facet to the first exit facet.

3. The optical backplane of claim 1, wherein the first optics system includes a collimating lens and an optical steering element, wherein the collimating lens collimates the light beam emitted by the E/O converter to produce the collimated light beam, and wherein the optical steering element steers the collimated light beam toward the first entrance facet.

4. The optical backplane of claim 3, wherein the optical steering element is a refractive optical element.

5. The optical backplane of claim 1, wherein the second optics system includes an optical steering element and a focusing lens, wherein the optical steering element receives the collimated light beam coupled out of the first exit facet and directs the collimated light beam onto the focusing lens, and wherein the focusing lens focuses the collimated light beam onto the O/E converter.

6. The optical backplane of claim 5, wherein the optical steering element is a refractive optical element.

7. The optical backplane of claim 5, wherein the optical steering element is a diffractive optical element.

8. The optical backplane of claim 1, wherein the optical backplane has a length, L, equal to a distance between the first entrance and exit facets, and wherein L is greater than about 0.5 meters (m).

9. The optical backplane of claim 6, wherein L is about 1.0 m.

10. The optical backplane of claim 1, wherein the slab further includes at least a second exit facet and wherein the optical backplane further comprises:
    a diffractive optical element disposed at the first entrance facet, the diffractive optical element splitting the collimated light beam coupled into the first entrance facet into at least first and second collimated light beams, and wherein said at least one optical relay element includes at least first and second optical relay elements, the first optical relay element reflecting and refocusing the first collimated light beam as the first collimated light beam propagates through the slab from the first entrance facet to the first exit facet, the second optical relay element reflecting and refocusing the second collimated light beam as the second collimated light beam propagates through the slab from the first entrance facet to the second exit facet;
    a third optics system generally aligned with the second exit facet, wherein the third optics system is configured to receive the second collimated light beam as the second collimated light beam propagates out of the second exit facet and to focus the second collimated light beam; and
    a second O/E converter configured to receive the second focused collimated light beam output from the third optics system and to convert the second focused collimated light beam into an electrical signal.

11. The optical backplane of claim 10, wherein the third optics system includes an optical steering element and a focusing lens, wherein the optical steering element of the third optics system receives the collimated light beam coupled out of the second exit facet and directs the collimated light beam onto the focusing lens of the third optics system, and wherein the focusing lens of the third optics system focuses the collimated light beam onto the second O/E converter.

12. The optical backplane of claim 11, wherein the optical steering element is a refractive optical element.

13. The optical backplane of claim 11, wherein the optical steering element is a diffractive optical element.

14. The optical backplane of claim 10, wherein the optical backplane has a first length, L1, equal to a distance between the first entrance and exit facets, and wherein L1 is greater than about 0.5 meters (m), and wherein the optical backplane has a second length, L2, equal to a distance between the first entrance facet and the second exit facet, and wherein L2 is greater than about 0.5 meters (m).

15. The optical backplane of claim 14, wherein L1 and L2 are about 1.0 m.

16. A method for propagating a light beam in an optical backplane comprising:
- with at least one electrical-to-optical (E/O) converter, converting an electrical signal into a light beam having a primary wavelength and emitting the light beam from the E/O converter;
- with a first optics system, collimating the light beam emitted by the E/O converter and steering the collimated light beam toward a slab of material that is transparent to at least the primary wavelength, the slab having at least first and second side walls, a first entrance facet, and a first exit facet, the first and second side walls being at least substantially parallel to one another, the first entrance and exit facets being located at or near opposite ends of the slab, the slab being positioned relative to the first optics system such that the first entrance facet is generally aligned with the first optics system;
- at the first entrance facet of the slab, coupling the collimated light beam steered toward the slab by the first optics system into the slab, wherein the collimated light beam is reflected at least once off of at least one of the first and second side walls and is incident on at least one optical relay element disposed on at least one of the first and second side walls, wherein said at least one optical relay element reflects and refocuses the collimated light beam to guide the collimated light beam in the slab and to prevent the collimated light beam from diverging as the collimated light beam propagates in the slab from the first entrance facet to the first exit facet;
- with a second optics system generally aligned with the first exit facet, receiving the collimated light beam propagating out of the first exit facet and focusing the collimated light beam onto an optical-to-electrical (O/E) converter; and
- with the O/E converter, receiving the focused collimated light beam output from the second optics system and converting the focused and collimated light beam into an electrical signal.

17. The method of claim 16, wherein at least two of the optical relay elements are disposed on or in at least one of the first and second side walls, each of the optical relay elements reflecting and refocusing the collimated light beam reflected off of one of the first and second side walls to guide the collimated light beam and to prevent the collimated light beam from diverging as the collimated light beam propagates in the slab from the first entrance facet to the first exit facet.

18. The method of claim 16, wherein the first optics system includes a collimating lens and an optical steering element, wherein the collimating lens collimates the light beam emitted by the E/O converter to produce the collimated light beam, and wherein the optical steering element steers the collimated light beam toward the first entrance facet.

19. The method of claim 18, wherein the optical steering element is a refractive optical element.

20. The method of claim 16, wherein the second optics system includes an optical steering element and a focusing lens, wherein the optical steering element receives the collimated light beam coupled out of the first exit facet and directs the collimated light beam onto the focusing lens, and wherein the focusing lens focuses the collimated light beam onto the O/E converter.

21. The method of claim 20, wherein the optical steering element is a refractive optical element.

22. The method of claim 20, wherein the optical steering element is a diffractive optical element.

23. The method of claim 16, wherein the optical backplane has a length, L, equal to a distance between the first entrance and exit facets, and wherein L is greater than about 0.5 meters (m).

* * * * *